US010688822B1

(12) United States Patent
Jones et al.

(10) Patent No.: US 10,688,822 B1
(45) Date of Patent: Jun. 23, 2020

(54) EMBEDDING 3D INFORMATION IN DOCUMENTS

(71) Applicant: MorphoTrust USA, LLC, Billerica, MA (US)

(72) Inventors: Robert Jones, Andover, MA (US); Yecheng Wu, Lexington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/392,375

(22) Filed: Apr. 23, 2019

Related U.S. Application Data

(62) Division of application No. 14/984,730, filed on Dec. 30, 2015, now abandoned.

(60) Provisional application No. 62/098,904, filed on Dec. 31, 2014, provisional application No. 62/098,276, (Continued)

(51) Int. Cl.
*B42D 25/309* (2014.01)
*B42D 25/23* (2014.01)
*D21H 21/48* (2006.01)
*G06T 3/00* (2006.01)
(Continued)

(52) U.S. Cl.
CPC .......... *B42D 25/309* (2014.10); *B42D 25/23* (2014.10); *D21H 21/48* (2013.01); *G06T 1/0071* (2013.01); *G06T 3/0031* (2013.01); *H04N 13/344* (2018.05); *G06T 2201/0051* (2013.01); *G06T 2201/0062* (2013.01); *G06T 2201/0065* (2013.01)

(58) Field of Classification Search
CPC ...... B42D 25/309; B42D 25/23; D21H 21/48; G06T 3/0031; G06T 1/0071; G06T 2201/0065; G06T 2201/0051; G06T 2201/0062; H04N 13/344
USPC .............. 283/67, 70, 72, 74, 75, 94, 98, 901
See application file for complete search history.

(56) References Cited

U.S. PATENT DOCUMENTS

| 4,729,128 A | 3/1988 | Grimes |
| 4,973,087 A | 11/1990 | Balogh |
| 5,142,383 A | 8/1992 | Mallik |

(Continued)

FOREIGN PATENT DOCUMENTS

| EP | 0372837 | 6/1990 |
| JP | 2000177229 | 6/2000 |

(Continued)

*Primary Examiner* — Justin V Lewis
(74) *Attorney, Agent, or Firm* — Fish & Richardson P.C.

(57) ABSTRACT

Methods, systems, and apparatus, including computer programs encoded on a computer storage medium, for obtaining information to be embedded within an identification document. Modifying the information to add depth when viewed through a three-dimensional (3D) viewing device, thereby yielding modified information. Embedding the modified information in a target image to yield a modified target image such that the modified information is not viewable to a naked eye and the modified information is visible with added depth when viewed through a 3D viewing device. Disposing the modified target image on an identification document to yield embedded 3D information. An identification document includes the target image and 3D information embedded within the target image. The 3D information embedded within the target image is not visible to a naked eye, but is visible with added depth when viewed through a 3D viewing device.

20 Claims, 5 Drawing Sheets

Related U.S. Application Data filed on Dec. 30, 2014, provisional application No. 62/098,236, filed on Dec. 30, 2014.

(51) Int. Cl.
 *G06T 1/00* (2006.01)
 *H04N 13/344* (2018.01)

(56) References Cited

U.S. PATENT DOCUMENTS

| | | |
|---|---|---|
| 8,998,264 B2 | 4/2015 | Dorfler |
| 2004/0032489 A1 | 2/2004 | Tyra |
| 2004/0160640 A1 | 8/2004 | Corrales |
| 2005/0161512 A1 | 7/2005 | Jones |
| 2006/0151989 A1 | 7/2006 | Muke |
| 2007/0102921 A1 | 5/2007 | Wang |
| 2007/0132227 A1 | 6/2007 | Dean |
| 2007/0273146 A1 | 11/2007 | Davis |
| 2009/0102605 A1 | 4/2009 | Kaule |
| 2010/0001508 A1 | 1/2010 | Tonnpkin |
| 2010/0045024 A1 | 2/2010 | Attner |
| 2010/0314861 A1 | 12/2010 | Amidror |
| 2011/0031735 A1 | 2/2011 | Gerigk |
| 2011/0037247 A1 | 2/2011 | Tappij-Gielen |
| 2011/0057040 A1 | 3/2011 | Jones |
| 2012/0074684 A1 | 3/2012 | Marchant |
| 2012/0210107 A1 | 8/2012 | Luick |
| 2012/0228860 A1 | 9/2012 | Rauch |
| 2012/0308072 A1* | 12/2012 | Lef Bvre ............... B41M 3/008 382/100 |
| 2013/0182300 A1 | 7/2013 | Muller |
| 2014/0028775 A1 | 1/2014 | Lazzari |
| 2015/0210107 A1 | 7/2015 | Nugent |
| 2016/0086066 A1 | 3/2016 | Porras Soto |
| 2016/0109629 A1 | 4/2016 | Baloukas |
| 2017/0046901 A1 | 2/2017 | Chosson |

FOREIGN PATENT DOCUMENTS

| | | |
|---|---|---|
| WO | WO 2008084315 | 7/2008 |
| WO | WO 2012117169 | 9/2012 |
| WO | WO 2014186718 | 11/2014 |

\* cited by examiner

EMBEDDING 3D INFORMATION IN DOCUMENTS

CROSS REFERENCE TO RELATED APPLICATIONS

This application is a divisional application of U.S. patent application Ser. No. 14/984,730 filed Dec. 30, 215, which claims priority to U.S. Patent Application Ser. No. 62/098,276 entitled "IDENTIFICATION DOCUMENT WITH WINDOW" and filed on Dec. 30, 2014; U.S. Patent Application Ser. No. 62/098,236 entitled "IDENTIFICATION DOCUMENT WITH MULTIVIEW IMAGE" and filed on Dec. 30, 2014; and U.S. Patent Application Ser. No. 62/098,904 entitled "IDENTIFICATION DOCUMENT WITH EMBEDDED 3D INFORMATION" and filed on Dec. 31, 2014, all of which are herein incorporated by reference in their entirety.

TECHNICAL FIELD

This disclosure generally relates to methods, systems, and apparatus, including computer programs encoded on a computer storage medium, for embedding 3D information in documents.

BACKGROUND

Identification ("ID") documents play a critical role in today's society. One example of an ID document is an ID card. ID documents are used on a daily basis to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, make a payment, and the like.

SUMMARY

In one general implementation, innovative aspects of the subject matter described in this specification can be embodied by identification document that includes a target image and three-dimensional (3D) information embedded within the target image. The target image includes two-dimensional information, and the 3D information embedded within the target image is not visible to a naked eye. The 3D information is visible with added depth when viewed through a 3D viewing device. This and other implementations can each optionally include one or more of the following features.

In some implementations, the 3D information includes a left eye component of a first color and a right eye component of a second color that is chromatically opposite to the first color.

In some implementations, pixels of the target image are modified with pixels of the 3D information to embed the 3D information into the target image.

In some implementations, the identification documents includes a second target image including two-dimensional information, and second 3D information embedded within the second target image. The second 3D information is not visible to the naked eye or when viewed through the 3D viewing device, and the second 3D information is visible with added depth when viewed through a second, different 3D viewing device.

In some implementations, the target image can be a photographic image of the cardholder.

In some implementations, the 3D information can include text.

In some implementations, the 3D information can include a graphic.

In some implementations, the 3D viewing device can be a pair of 3D stereoscopic viewing glasses.

In some implementations, the identification document can be a digital identification document.

In some implementations, the 3D viewing device can be an electronic 3D viewing device.

In another general implementation, innovative aspects of the subject matter described in this specification can be embodied in methods for making an identification document with embedded 3D information that include the actions of obtaining information to be embedded within an identification document. Modifying the information to add depth when viewed through a 3D viewing device, thereby yielding modified information. Embedding the modified information in a target image to yield a modified target image such that the modified information is not viewable to a naked eye and the modified information is visible with added depth when viewed through a 3D viewing device. Disposing the modified target image on an identification document to yield embedded 3D information. Other implementations of this aspect include corresponding systems, apparatus, and computer programs, configured to perform the actions of the methods, encoded on computer storage devices. These and other implementations can each optionally include one or more of the following features.

In some implementations, modifying the information can include generating a left eye image of the information and a right eye image of the information, and combining the left eye image and the right eye image to yield the modified information.

In some implementations, the information can include text, a graphic, or an image.

In some implementations, embedding the modified information in the target image can include modifying pixels of the target image with pixels of the modified information.

In some implementations, modifying the pixels of the target image with the pixels of the modified information can include mapping pixels of the modified information to respective pixels of the target image so as to position the modified information at a desired location within the target image, and performing a mathematical or a logical operation between mapped pixels of the modified information and corresponding pixels of the target image.

In some implementations, modifying the pixels of the target image with the pixels of the modified information can include replacing the pixels of the target image with the pixels of the modified information.

In some implementations, the left eye image can be a first color and the right eye image can be a second color that is chromatically opposite to the first color.

In some implementations, disposing the modified target image on the identification document can include printing the modified target image on a layer of the identification document.

In some implementations, disposing the modified target image on the identification document can include encoding the modified target image in a digital identification document.

In some implementations, the identification document can be a digital identification document. Modifying the information can include generating a left eye image of the information and a right eye image of the information. Embedding the modified information in the target image can include combining the left eye image with the target image to yield a left eye target image, and combining the right eye image with the target image to yield a right eye target image. Disposing the modified target image on an identification document can include encoding instructions within the identification document that cause a computing device to alternately display the left eye target image and the right eye target image such that the information is viewable with added depth when viewed through an electronic 3D viewing device.

In some implementations, the target image is a digital image of the ID document.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
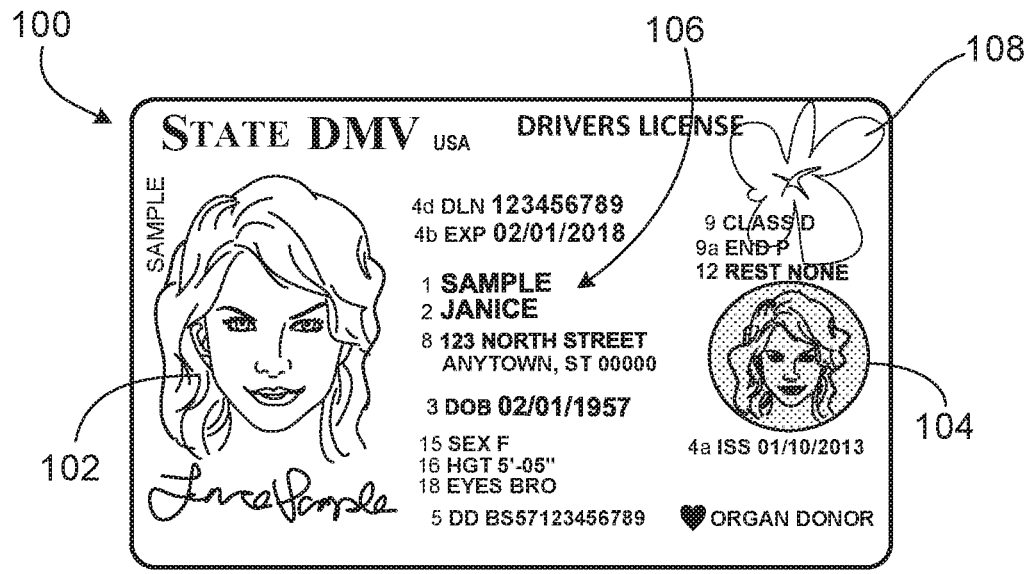
FIG. 1 depicts an ID document with embedded 3D information viewed without the aid of a 3D viewing device.

Implementations of the present disclosure include physical and digital identification (ID) documents with embedded three-dimensional (3D) information. ID documents described herein include 3D information embedded in other text, images, or graphics of the ID document. The 3D information is not obvious to the naked eye without the aid of a specialized 3D viewing device. In addition, implementations of the present disclosure also include methods for embedding 3D information in physical or digital ID documents.

As efforts to counterfeit identification documents become more sophisticated, additional features are needed for secure credentialing. For example, ID documents with embedded 3D information allow personalized credentials to be added to an ID document in such a way that the personalized credentials are not obvious to the naked eye and are only visible using specialized viewing devices. This feature provides an additional security measure to identify counterfeit ID documents and increases the difficulty associated with making a forgery, because the embedded information is personalized and not obvious to the naked eye. Embedded information may include text, graphical patterns, images, and the like, and may be embedded at any location in an ID document.

Physical ID documents described herein are suitable for Dye Diffusion Thermal Transfer (D2T2) personalization, laser (e.g., YAG and $CO_2$) personalization, or both. These ID documents may be "over-the-counter" documents or "central issue" documents, and may be personalized in either process. The ID documents may have transparency enhancement properties. U.S. 2011/0057040, entitled "OPTICALLY VARIABLE PERSONALIZED INDICIA FOR IDENTIFICATION DOCUMENTS" is incorporated by reference herein with respect to various features and fabrication processes related to physical ID documents.

As used herein, "ID document" is broadly defined and intended to include all types of physical and digital ID documents, including, documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, handgun permits (e.g., concealed handgun licenses (CHL)), badges, gift certificates or cards, membership cards or badges, and tags. Also, the terms "document," "card," "badge" and "documentation" are used interchangeably throughout this disclosure. In addition, ID document can include any item of value (e.g., currency, bank notes, and checks) where authenticity of the item is important, where counterfeiting or fraud is an issue, or both.

As used herein, "digital ID document" is broadly defined and intended to include a digital renderings (e.g., digital images) of ID documents (e.g., a corresponding physical ID document) by a software application that allows a customer to carry and display one or more forms of digital identification. In some examples, digital IDs can include multiple layers of security features to provide security and prevent counterfeiting. In some implementations, a first level of security features can include security features that are visually verifiable (e.g., by rendering on a display of a computing device, such as a smartphone) without the aid of a specialized viewing device. Such first level security features can include, for example, rotating images and holograms. A second level of security features can include, for example, provision of cardholder data that is verifiable visually with the assistance of security tools such as specialized 3D viewing devices, infrared (IR) transceivers, and other electronic code readers (e.g., QR code readers). Such first level security features can include, for example, embedded 3D information and audio, radiofrequency, or IR digital watermarks.

ID documents such as driver licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

In the production of images useful in the field of identification documentation, it may be desirable to embody into a document (such as an ID card, driver license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

As used herein, "identification" at least refers to the use of an ID document to provide identification and/or authentication of a user and/or the ID document itself. For example, in a driver license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one instance, include covert images that, when viewed using the proper facilitator (e.g., an appropriate light source for covert images, an appropriate temperature source for thermochromic images, etc.), provide a discernable image that is usable for identification or authentication purposes.

There are a number of reasons why an image or information on an ID document might not qualify as an "identification quality" image. Images that are not "identification quality" may be too faint, blurry, coarse, small, etc. to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g., hair color or eye color) of an individual.

Certain images may be considered to be "identification quality" if the images are machine readable or recognizable, even if such images do not appear to be "identification quality" to a human eye, whether or not the human eye is assisted by a particular piece of equipment, such as a special light source. For example, in at least one implementation, an image or data on an ID document can be considered to be "identification quality" if it has embedded in it machine-readable information (such as digital watermarks or steganographic information) that also facilitate identification and/or authentication.

Further, in at least some implementations, "identification" and "authentication" are intended to include (in addition to the conventional meanings of these words), functions such as recognition, information, decoration, and any other purpose for which an indicia can be placed upon an article in the article's raw, partially prepared, or final state. Also, in addition to ID documents, techniques described herein can be employed with product tags, product packaging, business cards, bags, charts, maps, labels, and the like, particularly those items including marking of a laminate or over-laminate structure. "ID document" thus is broadly defined herein to include these tags, labels, packaging, cards, etc.

"Personalization," "personalized data," and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some implementations, personal/variable data can include some fixed data, as well.

For example, in at least some implementations, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the ID document or to the ID document's issuer. For example, personalized data may include a lot number, inventory control number, manufacturing production number, serial number, digital signature, etc. Such personalized or fixed data can, for example, indicate the lot or batch of material that was used to make the ID document, what operator and/or manufacturing station made the ID document and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some implementations, an indicium formed on any layer in an ID document may be partially or wholly in the form of a marking visible only under non-visible radiation. Markings including, for example, a visible "dummy" image superposed over a non-visible "real" image intended to be machine read may also be used.

"Laminate" and "overlaminate" include (but are not limited to) film and sheet products. Laminates usable with at least some implementations include those which contain substantially transparent polymers or which have substantially transparent polymers as a part of their structure. Examples of suitable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer, a film layer, or both.

The degree of transparency of the laminate can, for example, be dictated by the information contained within the ID document, the particular colors and/or security features used, etc. The thickness of the laminate layers is not critical, although in some implementations it may be preferred that the thickness of a laminate layer be about 1-20 mil (about 25-500 µm). Types and structures of the laminates described herein are provided only by way of example, those skilled in the art will appreciated that many different types of laminates are suitable.

For example, in ID documents, a laminate can provide a protective covering for the printed substrates and provides a level of protection against unauthorized tampering (e.g., a laminate would have to be removed to alter the printed information and then subsequently replaced after the alteration). The material(s) from which a laminate is made may be transparent, but need not be. Laminates can include synthetic resin-impregnated or coated base materials composed of successive layers of material, bonded together via heat, pressure, or both. As described herein, laminates may be fused polycarbonate structures formed in the absence of adhesives. Laminates also include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxies.

For purposes of illustration, examples illustrate various aspects using images that are representative of a bearer of an ID document (e.g., a photographic likeness). However, virtually any indicium can be usable as an "image," which is used herein to include virtually any type of indicium.

In some examples, ID documents can be made of various materials (e.g., TESLIN-core, multi-layered ID documents) and fused polycarbonate structures. Indeed, it should be appreciated that implementations disclosed herein can be applied to many ID document materials formed in many different ways. For example, implementations can be applied to ID materials including, but not limited to, a laminate and/or coating, articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

Different image processing techniques may be used to preprocess an original image that is to be printed as images or graphics on an ID document. For example, different image processing techniques may be used prepare an embedded 3D image, a covert and/or optically variable image (using, for example, covert and/or optically variable media) for printing on an ID document depending on whether the tonality of image reproduction (e.g., printing process) is bitonal (e.g., two tones such as black and white or a first color and second color) or monochromatic (e.g., shaded image, grayscale, etc.). Other optional factors to consider include the viewing methods used with the image, such as reflectance, transmissive characteristics (e.g., UV glowing) and tactility. As used herein, "optically variable device" (OVD) generally refers to an image (e.g., an iridescent image) that exhibits various optical effects such as movement or color changes when viewed.

In some cases, an image may be in digital form, such as resulting from being digitally captured, e.g., via a digital camera, optical sensor, etc., or through scanning a photograph with a scanner, etc. In at least some implementations, this captured image may be refined to produce an intermediate image, which can be transferred or printed (or used to generate an image to be transferred or printed) to the ID document as a covert image.

In certain cases, bitonal images (e.g., black and white images), such as those produced through mass-transfer thermal printing and laser xerography, may be implemented. Generally, in this implementation, a captured image is processed to bring out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of an image, which can be transferred to an identification card.

Dye diffusion thermal transfer printing ("D2T2") and thermal transfer (also referred to as mass transfer printing) are two printing techniques that can be used to print information on identification cards. For example, D2T2 has been used to print images and pictures, and thermal transfer has been used to print text, bar codes, and single color graphics.

Dye diffusion is a thermal imaging technology that allows for the production of photographic quality images. In dye diffusion printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Printing with successive color panels across the document can create an image in or on the document's surface. Dye diffusion can result in a very high printing quality, especially because the energy applied to the thermal printhead can vary to vary the dye density in the image pixels formed on the receiver, to produce a continuous tone image. Dye diffusion can have an increased cost as compared to other methods, however, because of the special dyes needed and the cost of dye diffusion ribbons. Also, the quality of dye diffusion printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black, referred to by the symbol "K") is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using dye diffusion. However, mass transfer printing can sometimes be faster than dye diffusion, and faster printing can be desirable in some situations.

Printing of black ("K") can be accomplished using either dye diffusion or mass transfer. For example, black monochrome "K" mass transfer ribbons include Kr (which designates a thermal transfer ribbon) and Kd (which designates dye diffusion). The term "D2T2" is a combination of the phrases "Dye Diffusion" (D2) and "Thermal Transfer" (T2); T2 is a mass transfer ribbon panel and performs in a similar fashion as any other mass transfer technology. Both dye diffusion and thermal ink can be combined in a single ribbon (e.g., D2T2 ribbon), for example, a YMCK (Yellow-Magenta-Cyan-Black) ribbon. Another panel containing a protectant ("P") or laminate (typically a clear panel) also can be added to the YMCK ribbon. In some implementations, printing methodologies other than or in addition to D2T2 printing can be used. For example, the interlacing techniques can be achieved as part of a laser xerography or HP Indigo type printing processes.

Commercial systems for issuing ID documents are of two main types, namely so-called "central" issue (CI), and so-called "on-the-spot" or "over-the-counter" (OTC) issue. CI type ID documents are not immediately provided to the bearer, but are later issued to the bearer from a central location. For example, in one type of CI environment, a bearer reports to a document station where data is collected, the data are forwarded to a central location where the ID document is produced, and the ID document is forwarded to the bearer, often by mail. Another illustrative example of a CI assembling process occurs in a situation where a driver passes a driving test, but then receives her license in the mail from a CI facility a short time later. Still another illustrative example of a CI assembling process occurs in a situation where a driver renews her license by mail or over the Internet, then receives a driver license card through the mail.

In contrast, a CI assembling process is more of a bulk process facility, where many cards are produced in a centralized facility, one after another. For example, a situation where a driver passes a driving test, but then receives her license in the mail from a CI facility a short time later. The CI facility may process thousands of cards in a continuous manner.

Centrally issued ID documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI ID documents can offer durability. In addition, centrally issued digital ID documents generally offer a higher level of security than OTC ID documents because they offer the ability to pre-print the core of the CI ID document with security features such as "micro-printing," ultra-violet security features, security indicia and other features currently unique to centrally issued ID documents.

In addition, a CI assembling process can be more of a bulk process facility, in which many ID documents are produced in a centralized facility, one after another. The CI facility may, for example, process thousands of ID documents in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI ID documents, OTC ID documents are issued immediately to a bearer who is present at a document-issuing station. An OTC assembling process provides an ID document "on-the-spot". An illustrative example of an OTC assembling process is a Department of Motor Vehicles ("DMV") setting where a driver license is issued to person, on the spot, after a successful exam. In some instances, the very nature of the OTC assembling process results in small, sometimes compact, printing and card assemblers for printing the ID document. It will be appreciated that an OTC card issuing process can be by its nature an intermittent process in comparison to a continuous process.

OTC ID documents of the types mentioned above can take a number of forms, depending on cost and desired features. Some OTC ID documents comprise highly plasticized poly(vinyl chloride) or have a composite structure with polyester laminated to 0.5-2.0 mil (about 13-51 µm) poly(vinyl chloride) film, which provides a suitable receiving layer for heat transferable dyes which form a photographic image, together with any variant or invariant data required for the identification of the bearer. These data are subsequently protected to varying degrees by clear, thin overlay patches (0.125-0.250 mil, or about 3-6 µm) applied at the printhead, holographic hot stamp foils (0.125-0.250 mil, or about 3-6 µm), or a clear polyester laminate (0.5-10 mil, or about 13-254 µm) supporting common security features. These last two types of protective foil or laminate sometimes are applied at a laminating station separate from the printhead. The choice of laminate dictates the degree of durability and security imparted to the system in protecting the image and other data.

One response to the counterfeiting of ID documents includes the integration of verification features that are difficult to copy by hand or by machine, or which are manufactured using secure and/or difficult to obtain materials. One such verification feature is the use in the ID document of a signature of the ID document's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an ID document in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are difficult to manufacture without the requisite know-how, equipment, and materials.

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tone) image and the dye sublimation panel produces a monochromatic (or shaded) image.

Color shifting and other optically variable pigments, inks, dyes, and colorants (collectively "optically variable media") have a feature of appearing to change color as the viewing angle of an observer changes (or as the angle of incident light striking the media changes). Optically variable media have been used on security documents, such as identification cards, credit cards, checks, title documents, currency, etc. The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce many types of optically variable media, helping to reduce unauthorized reproduction or counterfeiting of such documents.

Several methods exist to create optically variable media and to apply such media to security documents. One method involves dispersing in a medium (e.g., paint or ink) a plurality of relatively small particles (typically flakes) that have specific optical properties. In one example, a security document includes a plurality of thin film layers, each film having a particular color and/or optical property. In some cases, media having optically variable properties include particles comprising flat, irregularly shaped mica platelets coated with titanium dioxide and/or iron oxide. These particles, when dispersed in media, can give a generally "pearlescent" effect, with smaller particles producing a "satin" effect and larger particles producing a "glitter" effect. In many instances, optically variable media are incorporated into a material such as a laminate layer or overlaminate layer, providing an optically variable indicia that overlays other information on the card. Generally, such an optically variable indicium contains "fixed" or "invariable" data (information that is the same from ID document to ID document).

In some examples, it is advantageous to print variable or personal UV information at the time of ID document personalization, in one, two, or three UV colors, especially images that have a high enough quality to be used for authentication and/or identification. It is also advantageous if the same information is printed in a visible and invisible (e.g., UV) form at substantially the same time or at substantially the same printing step, where the covert image would be "identification quality."

In some examples, 3D information can be embedded in ID documents in a variety of ways. In implementations of the present disclosure, an anaglyph 3D method can be used to create a 3D perception of embedded information in an ID document when viewed with a specialized viewing device (e.g., stereoscopic glasses). The 3D information is embedded within other images or features of an ID document such that the 3D information is not apparent when viewed with the naked eye.

FIG. 1 depicts a top view of an example ID document 100 with embedded 3D information when viewed without a 3D viewing device. As depicted, the ID document 100 includes an image 102, a covert image 104, text 106, and a graphic 108. Image 102 is preferably a color image (e.g., a color image of the cardholder). 3D information can be embedded in one or more of image 102, covert image 104, text 106, and graphic 108. As depicted in FIG. 1 the 3D information is not visibly apparent when viewed without a 3D viewing device. In some examples, one or more of the image 102, covert image 104, text 106, and graphic 108 can be embedded with 3D information to give the respective feature the appearance depth when viewed through a 3D viewing device.

Figure 2:
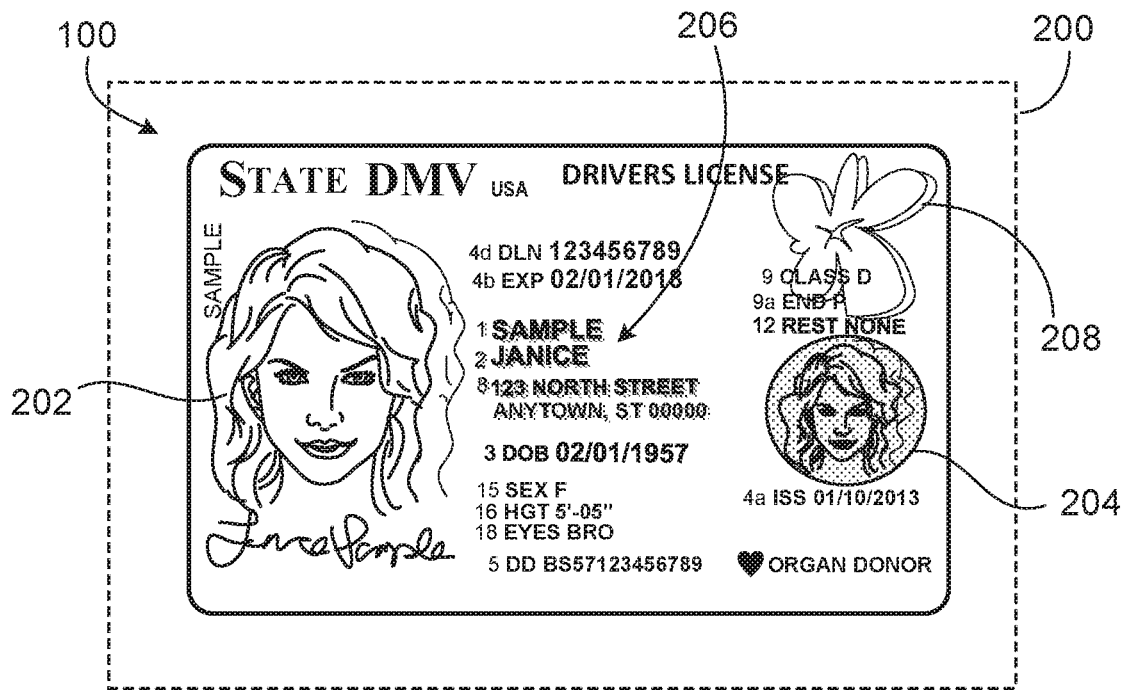
FIG. 2 depicts the ID document of FIG. 1 when viewed with a 3D viewing device.

FIG. 2 depicts the ID document 100 when viewed through a 3D viewing device 200. In the depicted implementation, each of each of the image 102, covert image 104, text 106, and graphic 108 has been embedded with 3D information. When viewed through the 3D viewing device 200 the embedded 3D information becomes visible. In the implementations shown, the 3D information includes depth information added to each of the image 102, covert image 104, text 106, and graphic 108. In other words, when viewed through the 3D viewing device 200 each of the image 102, covert image 104, text 106, and graphic 108 appear as a 3D image 202, 3D covert image 204, 3D text 206, and 3D graphic 208.

The 3D viewing device 200 can be, for example, stereoscopic glasses. For example, the stereoscopic glasses can include different chromatically opposite color filters in the left lens and the right lens (e.g., red-cyan or red-blue stereo viewing glasses). Furthermore, the 3D information to produce the appearance of depth can be corresponding left eye and right eye images for each of the image 102, covert image 104, text 106, and graphic 108. For example, the 3D information for the image 102 can include a left eye image and a right eye image of the graphic 108. Each eye's image is generated in a different chromatically opposite color from the other eye's image and correspond to filters in an appropriate 3D viewing device 200. Chromatically opposite color combinations include, for example, red/blue, red/cyan, green/purple, and blue/yellow. For example, the left eye image of the graphic 108 can be red and the right eye image of the graphic 108 can be cyan. Furthermore, the left and right eye images can be offset from each other by an appropriate distance to produce the desired depth effect.

Because the colors of the left eye and right eye image must correspond to the filters in the 3D viewing device 200 in order to be viewed with the appropriate effect, in some implementations, an ID document 100 can include multiple 3D effects each viewable with a different 3D viewing device 200. For example, the 3D image 202 may be a red/cyan anaglyph image and the 3D graphic 208 may be a blue/yellow 3D anaglyph image. Consequently, the 3D image 202 may be properly viewable only with red/cyan stereo glasses and the 3D graphic 208 may be properly viewable only with blue/yellow stereo glasses.

While in the implementation shown in FIG. 2 the 3D information was used to make each of the image 102, covert image 104, text 106, and graphic 108 appear to have added depth, in some implementations, the 3D information can be different from the target image (e.g., the image 102, covert image 104, text 106, or graphic 108) of the ID document 100 in which the 3D information is embedded. For example, personalized credentials, other graphics, or security features can be embedded within a target image of the ID document 100.

Figure 3A:
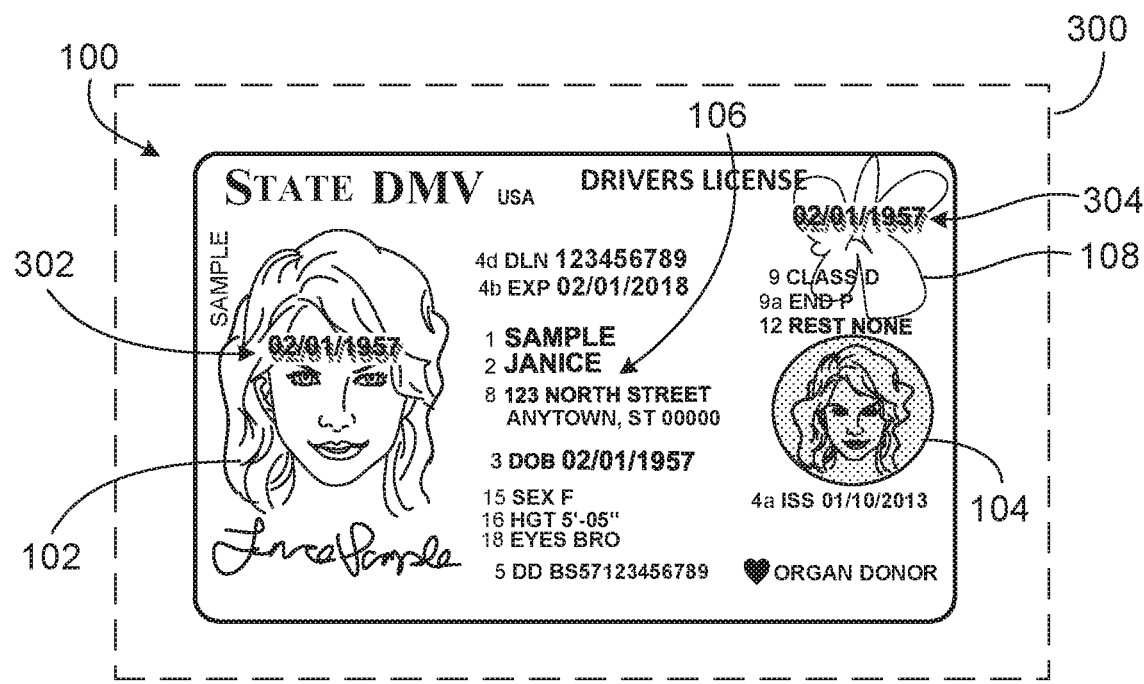
FIGS. 3A and 3B depict other implementations of ID documents with embedded 3D information viewed with a 3D viewing device.
Figure 3B:
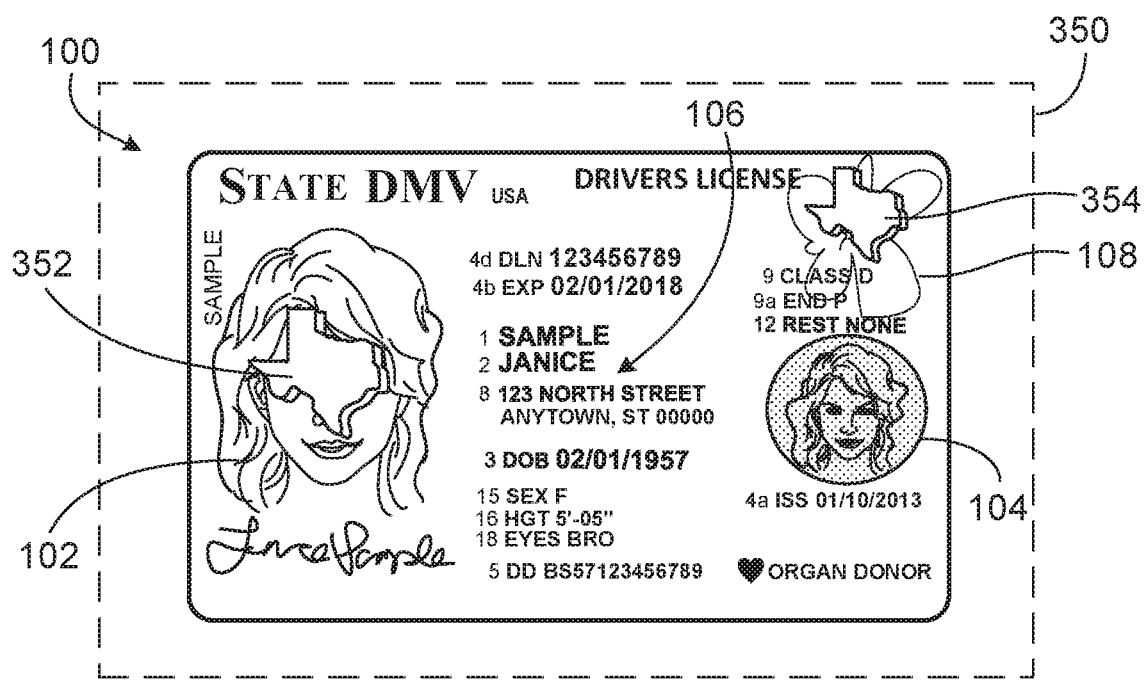

FIGS. 3A and 3B depict additional implementations of the ID document 100 with embedded 3D information when viewed with 3D viewing devices 300, 350. Referring first to FIG. 3A, in the depicted implementation, the image 102 and the graphic 108 are embedded with 3D information. In the example shown, both the image 102 and the graphic 108 are embedded with a 3D image of the cardholder's birthdate 302, 304 (e.g. Feb. 1, 1957). When viewed through the 3D viewing device 300 the embedded 3D information becomes visible. Specifically, in the implementations shown, the 3D information includes the cardholder's birthdate 302 with added depth embedded within the 2D image 102 (e.g., the cardholder's portrait) and the cardholder's birthdate 304 with added depth embedded within the graphic 108 of the ID document 100. As discussed above, 3D viewing devices 300, 350 can be stereo glasses that are specific to viewing the 3D birthdate 302, 304 information on the ID document 100.

Likewise, the 3D viewing device 350 of FIG. 3B may be specific to viewing 3D graphics 352, 354 that are also embedded in the image 102 and graphic 108 of the ID document 100. Referring to FIG. 3B, in the depicted implementation, the image 102 and the graphic 108 are also embedded with additional different 3D information that was not visible using 3D viewing device 300. In the example shown, both the image 102 and the graphic 108 are embedded with a 3D graphic 352, 354 of the state that issued the ID document (e.g., Texas). When viewed through the 3D viewing device 350 the embedded 3D graphics 352, 354 become visible. More specifically, in the implementations shown, the 3D information includes a 3D graphic 352 of Texas embedded within the 2D image 102 (e.g., the cardholder's portrait) and a 3D graphic 354 of Texas embedded within the graphic 108 on the ID document 100.

As demonstrated by the examples depicted in FIGS. 3A and 3B, the ID document 100 has two sets of embedded 3D information each viewable with a different 3D viewing device 300, 350. More specifically, the cardholder's birthdate 302, 304 may be generated using a red left eye image and a cyan right eye image of the birthdate, while the 3D graphics 352, 354 may be generated using a blue left eye image and a yellow right eye image of a graphic of Texas. Furthermore, the 3D viewing device 300 may be red/cyan 3D stereo glasses, thereby, making the birthdate's 302, 304 viewable (as shown in FIG. 3A), while 3D viewing device 350 may be blue/yellow 3D stereo glasses, thereby, making the 3D graphics 352, 354 viewable (as shown in FIG. 3B).

As discussed in more detail below, the 3D information can be embedded in features of the ID document 100 by modifying the target feature using the 3D information. That is, a target image of the ID document 100 (e.g., the image 102, covert image 104, text 106, or graphic 108) can be modified with the 3D information (e.g., a 3D graphic 352, 354 or birthdate 302, 304). For example, pixels of a digital version of the target image can be modified with pixels of a digital versions of left eye and right eye images of the 3D information. The digitally modified target image can then be used as a master image for printing the target image with embedded 3D information onto an appropriate layer a physical ID document.

While the embedded 3D graphics 352 and 354 are depicted as being the same, some implementations may contain different information. For example, 3D graphic 352 may be the cardholder's birthdate and 3D graphic 354 may be an image of the state of Texas. Furthermore, while a cardholder's birthdate and an image of an issuing state are depicted as examples of embedded 3D information, the 3D information embedded in ID documents can include, for example, an image of the cardholder, a ghost image, an ID number (e.g., driver's license number), a cardholder's address, a security code, etc.

In some implementations, ID documents, such as ID document 100, can have one or more additional features, an optically variable ghost image. A ghost image may overlap image 102. An optically variable ghost image can be a screened-back or "ghost" version of image 102. In some cases, an optically variable ghost image can be a color or grayscale halftone version of the image 102

In some examples, an ID document 100, includes a covert image 104. A covert image 104 may also correspond to image 102, and may not be visible under "normal" viewing conditions. In some implementations, a covert image 104 is an ultraviolet (UV) image, meaning that it glows (e.g., visibly fluoresces or emits radiation) in response to appropriate UV stimulation. In some implementations, a covert image 104 fluoresces in the UV spectrum upon excitation with visible light. A covert image 104 may be generally imperceptible under normal (e.g., non-ultraviolet or non-angled) viewing conditions.

In some implementations, a covert image 104 is an infrared (IR) image, meaning that it glows (e.g., visibly fluoresces or emits radiation) in response to appropriate IR stimulation. In some implementations, a covert image 104 is a thermachromic image, meaning that it becomes visible only when the image (or entire ID document 100) is subject to a predetermined change in temperature, such as by heating or cooling. In some implementations, a covert image 104 is an optically variable image, meaning that the covert image 104 is most visible when viewed at a particular angle. In some implementations, a covert image 104 is formed using a material such as a ferrofluid (available from FeroTec of Nashua, N.H.). Ferrofluids are responsive to magnetic fields, and can be used to produce covert images 104 that become visible when an appropriate magnetic field is applied to the ferrofluid.

In some implementations, a covert image 104 is a combination of any one or more of UV, IR, thermachromic, ferrofluidic, and/or optically variable images. For example, a covert image 104 can be both a UV and a thermachromic image by printing the card area, using the methods described herein, with both UV and thermachromic inks, meaning that when subject to appropriate stimulation, the normally "blank" area of the card will display either a UV image (if appropriate UV stimulation is provided) or a thermachromic image (if appropriate temperature is provided). Those skilled in the art will appreciate that many combinations are possible. It is even envisioned that combination type inks, such as UV thermachromic inks (meaning inks that, to display an image, require both UV and appropriate temperature), the methods described herein will be usable with such inks.

In some implementations, a steganographic code is embedded into a covert image 104. One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some implementations, the ID document 100 includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from, for example, cameras in communication with a computing device or fully mobile readers with built-in displays. By imaging a watermarked surface of the card, the watermark's "payload" can be read and decoded by this reader.

In some implementations, a digital watermark may be embedded in a covert image 104. For example, if the covert image 104 is a printed UV image. A watermark detector can read the covert UV watermark only if ID document 100 is subject to appropriate UV stimulation at the same time that the host ID document 100 is presented to the watermark detector. This provided additional security to the ID document 100, because even if a counterfeiter is able to access UV inks to print a bogus covert image 104, the bogus covert image 104 will not contain the embedded digital watermark. Of course, mere photocopying or scanning of ID document 100 will similarly frustrate the counterfeiter, who will be unable to reproduce, through scanning or photocopying, either the covert image 104 or the watermark contained therein.

In some implementations, the watermark embedded in a covert image 104 may include a payload or message. The message may correspond, e.g., to the ID document number, printed information, issuing authority, biometric information of the bearer, and/or database record, etc. The watermark embedded in the covert image 104 may also include an orientation component, to help resolve image distortion such as rotation, scaling and translation. In at least one implementation, two or more watermarks are embedded in the optically variable device (OVD) image.

In some implementations, the watermark embedded in a covert image 104 corresponds to information printed on the ID document 100, or to information carried by a second watermark embedded elsewhere on the ID document 100 (e.g., a graphic 108 or image 102, etc.).

In some examples, an ID document 100 can also have one or more of the following features: Guilloche security design, micro-print, microprint with deliberate error, security indicia, laser perforation, split fountain printing, IDMARC, variable micro-script, altered font, overlapping data, UV printed variable data, redundant data, one-dimensional bar code, two-dimensional bar code, tri-color optically variable device, magnetic stripes, digital watermarks, and biometric information (e.g., fingerprint, etc.). Each of these features, along with the positioning or embedding of the features, is optional.

Methods for printing an optically variable image of variable data (e.g., data that can differ from card to card) onto the ID document, where the optically variable image has a metallic, iridescent, pearlescent, or "mirror-like" sheen or luster at a particular viewing angle, but which still enables the indicia to be perceived at the particular angle. The optically variable indicia is essentially invisible when the ID document is viewed from angles other than the particular angle. This optically variable image can comprise any type of indicium: images (e.g., a photograph), characters (e.g., a birthdate), graphics, etc. In particular, this optically variable image can comprise personalized data (e.g., data specific to a particular holder of an ID document or specific to a group of ID documents). In some implementations, an optically variable image is printed at the time of card personalization using a specially configured ribbon adapted for D2T2 and/or mass transfer printing.

Figure 4:
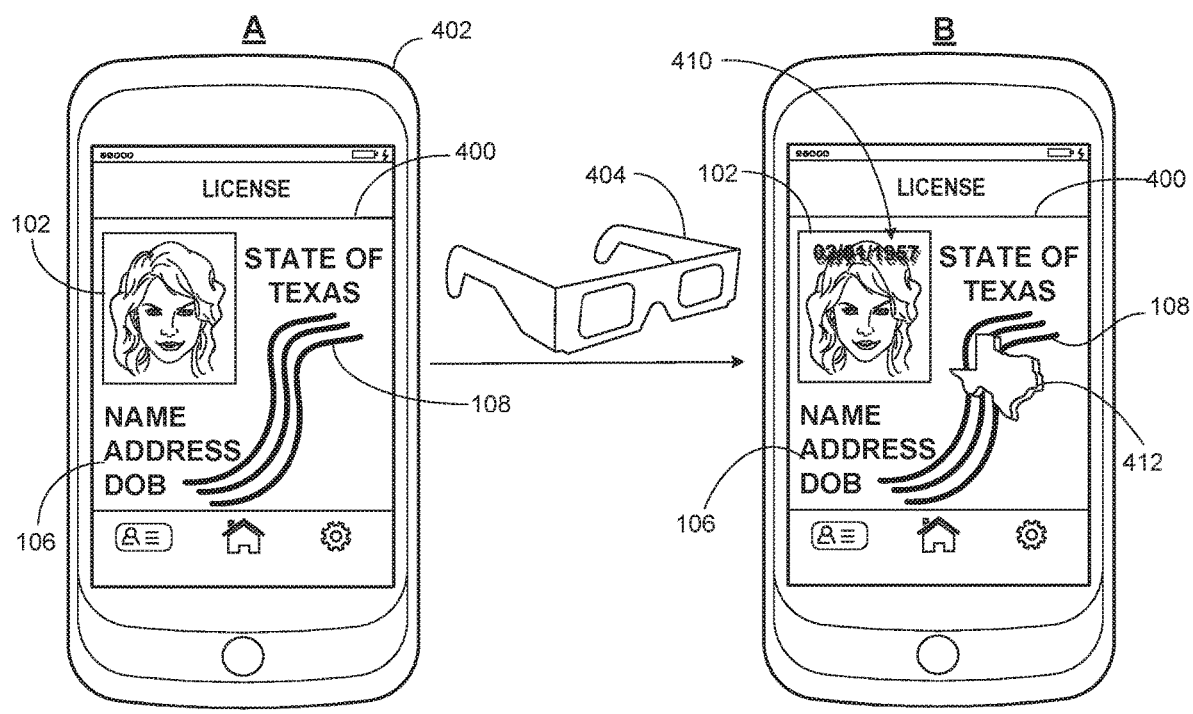
FIG. 4 depicts a digital ID document with embedded 3D information.

FIG. 4 depicts a digital ID document 400 with embedded 3D information. The digital ID document 400 is displayed on a display of a computing device 402. The computing device can be, for example, a smartphone, a PDA, tablet computer, or a special purpose digital ID storage and display device. As depicted, the digital ID document 400 includes an image 102, text 106, and graphic 108. For instance, the digital ID document 400 can be a digital rendering of a corresponding physical ID document (e.g., ID document 100). The digital ID document 400 can include some of the features of a physical ID document and some additional features as described herein.

Furthermore, FIG. 4 depicts two views (view A and view B) of the digital ID document 400. View A illustrates the digital ID document 400 as viewed without the aid of a 3D viewing device 404. View B illustrates the digital ID document 400 as viewed through a 3D viewing device 404. Similar to the ID document 100, when viewed through the 3D viewing device 404, embedded 3D information becomes visible on the digital ID document 400. As shown in view B, the digital ID document 400 includes a birthdate 410 as embedded 3D information in the image 102 and a 3D graphic 412 as embedded 3D information in the graphic 108.

In some implementations, the 3D information embedded in a digital ID document 400 can be configured to be viewed with stereo glasses as described above. For example, the 3D viewing device 404 can be stereoscopic glasses with chromatically opposite filters in each lens. In some implementations, the 3D information embedded in a digital ID document 400 can be viewable using an electronic 3D viewing device 404 (e.g., electronic shutter glasses). For example, the 3D viewing device 404 can be coupled (e.g., through a wired or wireless connection) with the computing device 402. The 3D viewing device 404 can by synchronized with a refresh rate of the computing device 402 such that left eye and right eye shutters of the 3D viewing device 404 alternately block and transmit light from the display in synchronization with the computing device 402 display's refresh rate. In such implementations, the embedded 3D information can be contained in alternately displayed left eye and right eye images of the 3D information that are embedded in the respective target image (e.g., the image 102 or graphic 108).

Figure 5:
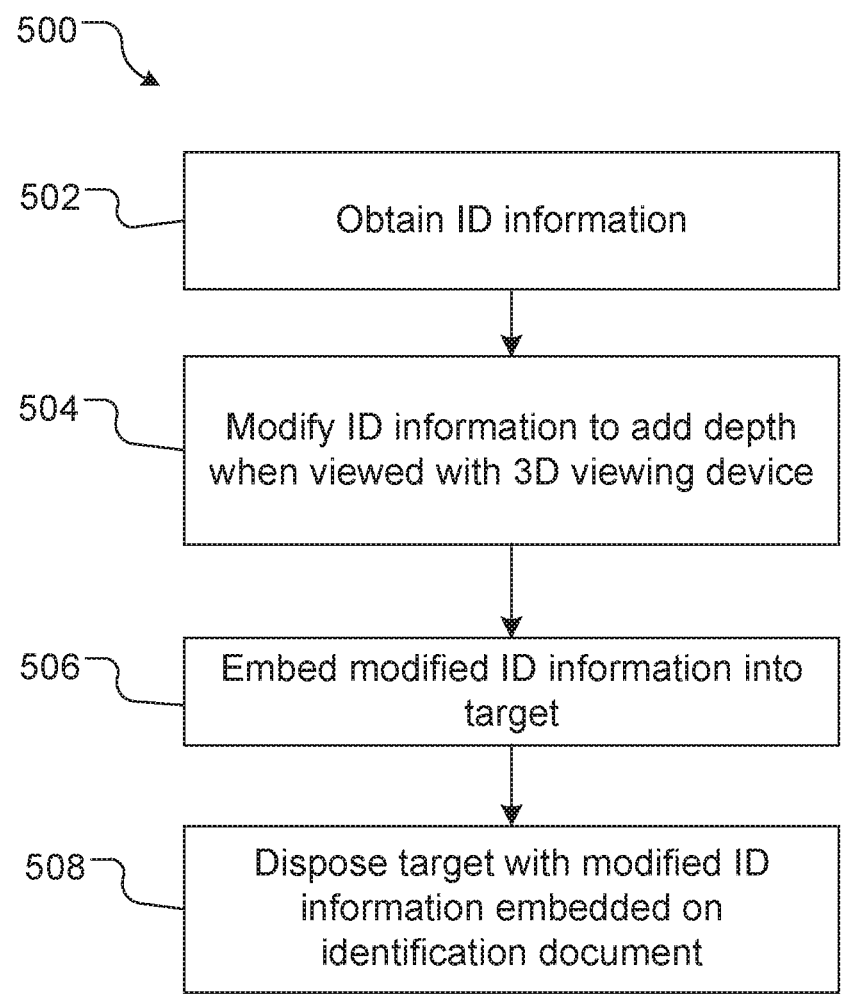
FIGS. 5 and 6 depict flowcharts of an exemplary process for embedding 3D information in an ID document.
Figure 6:
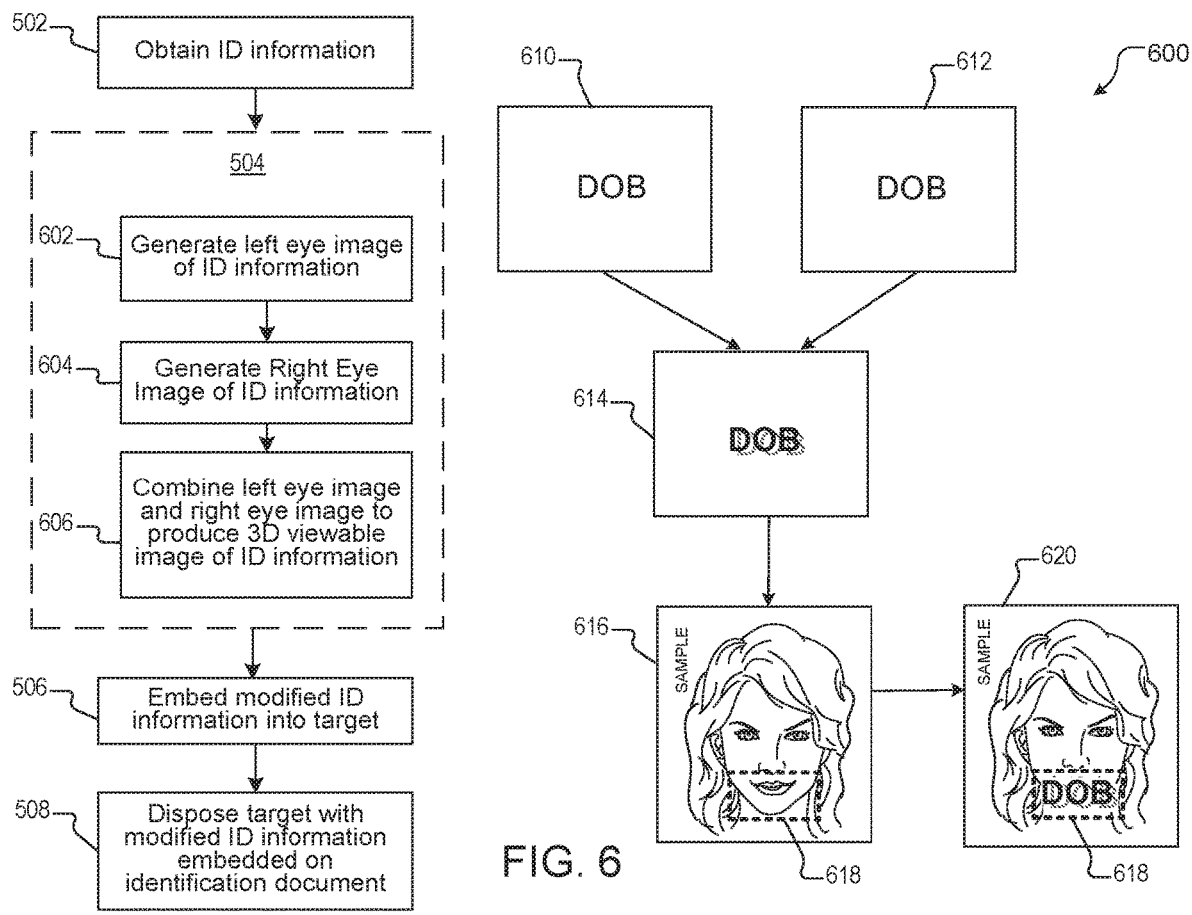

FIGS. 5 and 6 depict flowcharts of an exemplary process 500 for embedding 3D information in an ID document that can be executed in accordance with implementations of the present disclosure. In some implementations, the process 500 can be realized using one or more computer-executable programs that are executed using one or more computing devices. In some implementations, the process 500 can be executed using one or more computing devices to control identification document printing equipment.

ID information is obtained (502). For example, ID information can be obtained from an ID issuing authority (e.g., a state department of motor vehicles), cardholder database or a cardholder's application for an ID (e.g., driver's license or passport application). In some examples, the ID information can be personalized credential information (e.g., information that is specific to an ID cardholder). In some examples, the ID information can be specific to an ID issuing authority (e.g., a serial number, a lot number, etc.). ID information can include, for example, an image of the cardholder, a ghost image, an ID number (e.g., driver's license number), a cardholder's address, a security code, etc.

The ID information is modified to add depth when viewed with a 3D viewing device (504). For example, the ID information can be rendered as a digital image. The digital image of the ID information can be processed to add depth to the image to generate modified ID information. For example, the digital image can be processed using image processing techniques to generate an anaglyph 3D image of the ID information. In some implementations, the image of the ID information can be configured for use with an electronic 3D viewing device (e.g., electronic shutter glasses). The modified ID information that is produced can be a modified image of the ID information with the added depth.

The modified ID information can be embedded into a target (506). For example, the modified ID information can be embedded into a target image. The target image can be, for example, a 2D digital image of an ID document or a 2D digital image of a feature on an ID document (e.g., a cardholder's portrait, a covert image, text, or a graphic). The modified ID information can be embedded into the digital image of the target by, for example, modifying the target image with the modified ID information. For example, pixels in a region of the target image can be modified by using the modified ID information, as described in more detail below.

Embedding the target image with the modified ID information yields a modified target image that is disposed on an ID document (508). For example, in the case of a physical ID document, the modified target image can be disposed on an appropriate layer of an ID document. For example, the target image can be printed according to techniques described herein on a physical ID document. In the case of a digital ID document, the modified target image can be disposed on the ID document by integrating the modified target image into computer code that defines the digital ID document. In some examples, this can include storing the modified target image and generating code to access, encrypt, and decrypt the modified target image to be displayed in the digital ID document on a computing device.

FIG. 6 depicts a flowchart of a more detailed example of process 500 along with a graphical representation 600 of the process 500. Once the ID information is obtained (502), the appearance of depth can be added to the ID information (504) by generating left eye and right eye images of the ID information and combining the left eye and right eye images. More specifically, a left eye image 610 of the ID information (e.g., cardholder's date of birth (DOB)) is generated (602). For example, the left eye image 610 can be a digital image of the ID information in a first color. A right eye image 612 of the ID information is generated (604). For example, the right eye image 612 can be a digital image of the ID information in a second color that is different from the first color. For example, the first and second colors can be chromatically opposite to each other (e.g., red/cyan).

The left eye image 610 and the right eye image 612 are combined to produce a 3D image 614 of the ID information that is viewable with a 3D viewing device (606) (e.g., the modified ID information). For example, the left eye and right eye images 610, 612 can be combined by offsetting the images 610, 612 from each other by an appropriate distance to produce the desired depth effect, and calculating the colors of the 3D image 614 based on the colors of the left eye and right eye images 610, 612. For example, for an RGB (red-green-blue) 3D image 614, the red component pixels can be taken from a red left eye image 610, the green component pixels can be an average of respective pixels from the left eye and right eye images 610, 612, and the blue component pixels can be calculated from the blue right eye image 612. For example, for a CMYK 3D image 614 (e.g., used for printing), the cyan component pixels can be selected from a cyan right eye image 612, the magenta and yellow component pixels can be an calculated from a red left eye image 610, and the black component pixels can be an average of respective pixels from the left eye and right eye images 610, 612. For either implementation, the 3D image 614 will have the perception of added depth when viewed through a 3D viewing device.

The 3D image 614 is embedded in the target image 616 (e.g., a digital image of the cardholder) to yield a modified target image 620. For example, the 3D image 614 can be positioned relative to a region 618 of the target image 616 in which the 3D image 614 is to be embedded so as to map appropriate pixels of the 3D image 614 to corresponding pixels of the target image 616 within the desired region 618. To embed the 3D image 614 within the target image 616, the values of pixels in the target image 616 are modified based on values of corresponding pixels in the 3D image 614. For example, the target image 616 pixels can be modified by performing mathematical or logical operations between the values of corresponding pixels of the two images 614, 616. For example, the values of corresponding pixels can be added, subtracted, multiplied, or divided. Logical operations can include AND, OR, and XOR, for example. In some examples, a weighting (e.g., a fractional weighting) can be applied to the pixels of the 3D image 614, for example, to minimize distortions to the target image 616 when an ID document is viewed without a 3D viewing device and render the embedded 3D image 614 less detectable within the target image 616 of an ID document. In some implementations, a filter (e.g., a normalizing filter) may be applied to the modified target image 620 after the 3D image 614 is embedded, for example, to smooth color or grayscale levels of the modified target image 620 between the region 618 in which the 3D image is embedded and the remainder of the modified target image 620.

In some examples, the pixels of the target image 616 can be replaced by corresponding pixels of the 3D image 614. For example, dithering or color quantitation techniques can be used to selectively choose pixels of the target image 616 to be replaced so as to minimize distortions to the target image 616 when an ID document is viewed without a 3D viewing device. In addition, such techniques may render the embedded 3D image 614 less detectable within the target image 616 of an ID document.

It should be appreciated that while many of the figures shown herein illustrate a particular example of an ID document (e.g., a driver license) the scope of this disclosure is not so limited. Rather, methods and techniques described herein, apply generally to all ID documents defined above. Moreover, techniques described herein are applicable to non-ID documents, such as embedding 3D images in features of ID documents. Further, instead of ID documents, the techniques described herein can be employed with product tags, product packaging, business cards, bags, charts, maps, labels, etc. The term ID document is broadly defined herein to include these tags, labels, packaging, cards, etc. In addition, while some of the examples above are disclosed with specific core components, it is noted that laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, or any other suitable items or articles that may record information, images, and/or other data, which may be associated with a function and/or an object or other entity to be identified.

Further modifications and alternative implementations of various aspects will be apparent to those skilled in the art in view of this description. For example, while some of the detailed implementations described herein use UV, IR, thermachromic, and optically variable inks and/or dyes by way of example, the present disclosure is not so limited. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method of making an identification document with embedded 3D information, the method comprising:
    obtaining, by one or more processors, information to be embedded within an identification document;
    modifying, by the one or more processors, the information to add depth when viewed through a 3D viewing device, thereby yielding modified information;
    embedding, by the one or more processors, the modified information in a target image to yield a modified target image such that the modified information is not perceivable without the 3D viewing device and the modified information is visible with added depth when viewed through the 3D viewing device, wherein embedding the modified information in the target image comprises modifying pixels of the target image with pixels of the modified information; and
    causing, by the one or more processors, the modified target image to be disposed on an identification document to yield embedded 3D information.

2. The method of claim 1, wherein modifying the information comprises:
    generating a left eye image of the information and a right eye image of the information; and
    combining the left eye image and the right eye image to yield the modified information.

3. The method of claim 1, wherein the information comprises text, a graphic, or an image.

4. The method of claim 1, wherein modifying the pixels of the target image with the pixels of the modified information comprises:
    mapping pixels of the modified information to respective pixels of the target image so as to position the modified information at a desired location within the target image; and
    performing a mathematical or a logical operation between mapped pixels of the modified information and corresponding pixels of the target image.

5. The method of claim 1, wherein modifying the pixels of the target image with the pixels of the modified information comprises replacing the pixels of the target image with the pixels of the modified information.

6. The method of claim 2, wherein the left eye image comprises a first color and the right eye image comprises a second color that is chromatically opposite to the first color.

7. The method of claim 1, wherein causing the modified target image to be disposed on the identification document comprises printing the modified target image on a layer of the identification document.

8. The method of claim 1, wherein causing the modified target image to be disposed on the identification document comprises encoding the modified target image in a digital identification document.

9. The method of claim 1, wherein the identification document is a digital identification document, and
wherein modifying the information comprises generating a left eye image of the information and a right eye image of the information; and
wherein embedding the modified information in the target image comprises:
combining the left eye image with the target image to yield a left eye target image; and
combining the right eye image with the target image to yield a right eye target image, and
wherein disposing the modified target image on an identification document comprises encoding instructions within the identification document that cause a computing device to alternately display the left eye target image and the right eye target image such that the information is viewable with added depth when viewed through an electronic 3D viewing device.

10. The method of claim 9, wherein the target image is a digital image of the identification document.

11. The method of claim 4, wherein the mathematical operation comprises one or more of addition, subtraction, multiplication, or division between pixels.

12. The method of claim 4, wherein the logical operation comprises one or more of a logical AND operation, a logical OR operation, or a logical exclusive OR (XOR) operation between pixels.

13. A non-transitory computer readable storage medium storing instructions that, when executed by at least one processor, cause the at least one processor to perform operations comprising:
obtaining information to be embedded within an identification document;
modifying the information to add depth when viewed through a 3D viewing device, thereby yielding modified information;
embedding, by the one or more processors, the modified information in a target image to yield a modified target image such that the modified information is not perceivable without the 3D viewing device and the modified information is visible with added depth when viewed through the 3D viewing device, wherein embedding the modified information in the target image comprises modifying pixels of the target image with pixels of the modified information; and
causing the modified target image to be disposed on an identification document to yield embedded 3D information.

14. A system comprising:
one or more computers; and one or more data stores coupled to the one or more computers, the one or more data stores having instructions to embed 3D information in a document stored thereon which, when executed by the one or more computers, causes the one or more computers to perform operations comprising:
obtaining information to be embedded within an identification document;
modifying the information to add depth when viewed through a 3D viewing device, thereby yielding modified information;
embedding, by the one or more processors, the modified information in a target image to yield a modified target image such that the modified information is not perceivable without the 3D viewing device and the modified information is visible with added depth when viewed through the 3D viewing device, wherein embedding the modified information in the target image comprises modifying pixels of the target image with pixels of the modified information; and
causing the modified target image to be disposed on an identification document to yield embedded 3D information.

15. The system of claim 14, wherein modifying the information comprises:
generating a left eye image of the information and a right eye image of the information; and
combining the left eye image and the right eye image to yield the modified information.

16. The system of claim 14, wherein the information comprises text, a graphic, or an image.

17. The system of claim 14, wherein modifying the pixels of the target image with the pixels of the modified information comprises:
mapping pixels of the modified information to respective pixels of the target image so as to position the modified information at a desired location within the target image; and
performing a mathematical or a logical operation between mapped pixels of the modified information and corresponding pixels of the target image.

18. The system of claim 14, wherein modifying the pixels of the target image with the pixels of the modified information comprises replacing the pixels of the target image with the pixels of the modified information.

19. The system of claim 15, wherein the left eye image comprises a first color and the right eye image comprises a second color that is chromatically opposite to the first color.

20. The system of claim 14, wherein causing the modified target image to be disposed on the identification document comprises printing the modified target image on a layer of the identification document.

* * * * *